No. 671,043. Patented Apr. 2, 1901.
D. BEST.
GRAIN SEPARATOR AND CLEANER.
(Application filed Oct. 2, 1899.)
(No Model.)
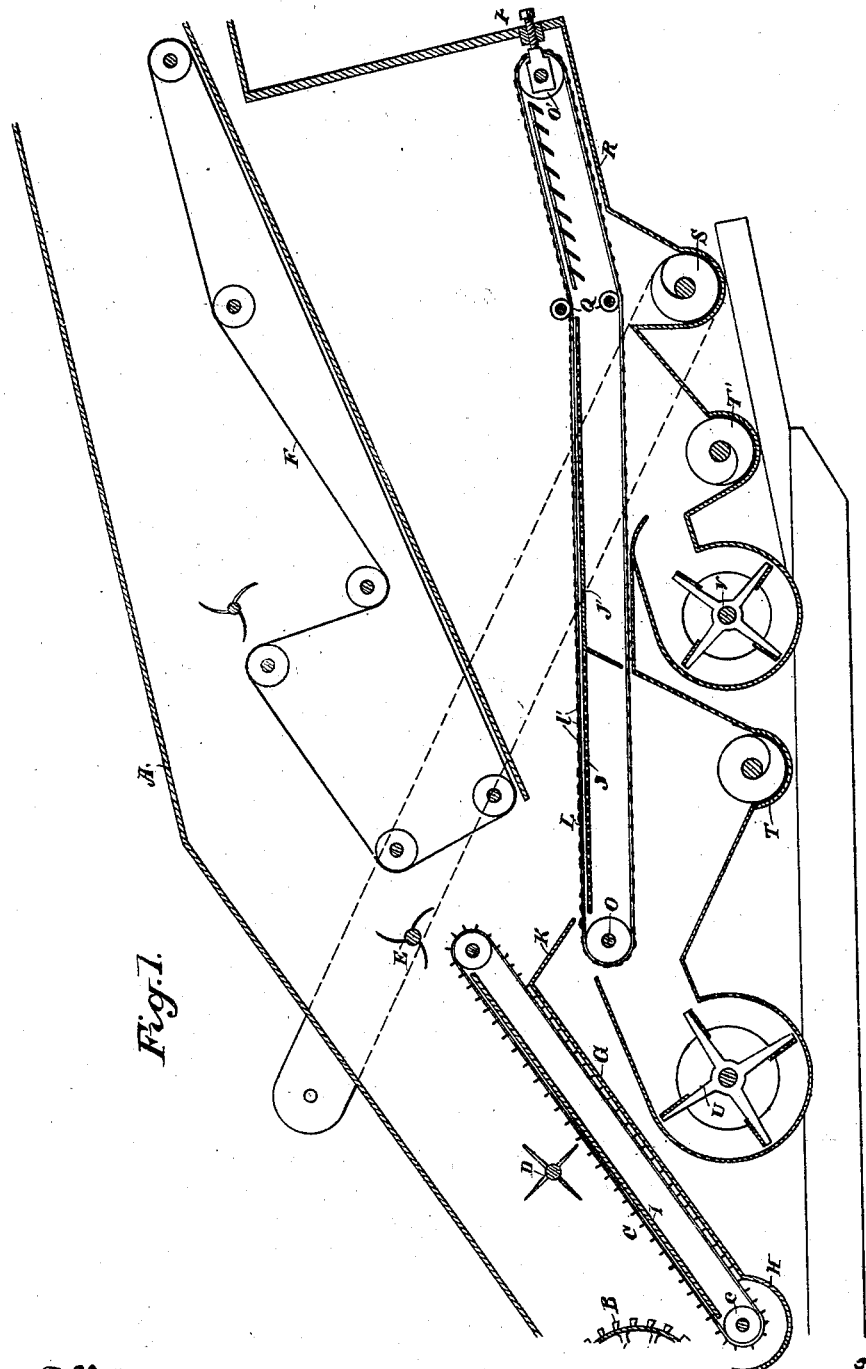

UNITED STATES PATENT OFFICE.

DANIEL BEST, OF SAN LEANDRO, CALIFORNIA.

GRAIN SEPARATOR AND CLEANER.

SPECIFICATION forming part of Letters Patent No. 671,043, dated April 2, 1901.

Application filed October 2, 1899. Serial No. 732,312. (No model.)

*To all whom it may concern:*

Be it known that I, DANIEL BEST, a citizen of the United States, residing at San Leandro, county of Alameda, State of California, have invented an Improvement in Grain Separators and Cleaners; and I hereby declare the following to be a full, clear, and exact description of the same.

My invention relates to an apparatus for separating grain from chaff and foul material with which it may be associated after threshing and for cleaning it.

It consists of a mechanism which will be more fully explained by reference to the accompanying drawings, in which—

Figure 1 is a vertical section through the machine. Fig. 2 is a longitudinal section through the screen and endless belt.

The usual methods employed for cleaning grain after it has been threshed, whether in connection with a stationary or a traveling mechanism, is to carry the grain upward and backward from the threshing-cylinder, to deliver the straw upon a straw-carrier which discharges it from the rear end of the machine, and to drop the grain through a space between the grain and straw carriers upon riddles which are carried in a shaking-shoe, and in conjunction with this an air-blast apparatus or fan is employed to blow the light chaff away, while the grain passes through the riddles and sieves to suitable carriers. In my invention I dispense with the shaking-shoe and combine with the above-named mechanism a table composed of riddles, screens, or sieves of any suitable construction and an endless traveling slat belt, which is adapted to move continuously over these screens, with air-blast devices, thus advancing the grain, which eventually passes through the screens, while the chaff and lighter material are blown away by the action of the fans.

In the present case I have shown my invention as applied to a threshing-machine of the ordinary construction, in which A is the outer frame and casing.

B is the threshing-cylinder.

C is the grain-carrier, upon which the threshed straw and the grain are received from the cylinder and are carried upwardly and backwardly. This endless grain-carrier passes over suitable drums or rollers at opposite ends and has transverse slats which assist to carry the grain and straw upward.

Beaters or pickers D are suitably arranged with relation to the grain-carrier to loosen up the straw and allow the grain to fall upon the belt, so that when it reaches the upper end it will drop upon the cleaning apparatus beneath, while the straw lifted and loosened by the picker E will pass onwardly over the straw-carrier F, which finally discharges it at the rear end of the machine. The straw-carrier may be of any suitable or well-known construction and is not here further described.

Experience has shown that the grain-carrier will always return some of the grain, no matter how free a discharge there may be at the upper end, and to save this grain a floor G extends beneath the lower part of the grain-carrier, so that any grain which falls upon it will be carried downwardly into the curved receiver H, which incloses the lower drum or roller c, about which the grain-carrier passes at this end. I is a second floor, which extends upwardly beneath the upper part of the grain-carrier C, its lower end terminating in close proximity to the drum c, and any grain which is carried back into the receiver H will be swept up by the cross-slats of the belt and deposited upon the floor I, so as to be again carried up by the upper portion of the carrier and eventually delivered upon the cleaning mechanism. This cleaning mechanism consists of screens, sieves, or riddles of any suitable or desired description, which are fixed in an approximately horizontal position, as shown at J, and the front end of these riddles is so placed that grain falling from the upper end of the grain-carrier C will fall upon the front end of the riddles.

K is a directing-board which insures the grain being delivered upon the riddles. I do not here describe any particular form or construction, since the riddles, screens, or sieves are all well known in the art and are made of many different materials, being varied as the conditions require.

L is an endless traveling belt passing around drums O O', the shafts of which are suitably journaled in the machine, and the outer drum O' is here shown as having a device P, by which its journal-shaft may be adjusted to regulate the tension of the belt L.

At a point contiguous to the outer or rear end of the screen J are guide-rollers Q, beneath which the edges of the belt pass, so as to allow the outer portion of it to be tilted upward at an angle with relation to the main portion, and this part of the belt passes over a screen or riddle surface so formed that any large straw or heads not sufficiently small to pass through the screans, but which it is desired to return to the threshing-machine, may fall, being received upon a floor R, over which the return lower portion of the belt passes, so that any such straw or heads are delivered into the auger-case S, and from this they are delivered by the well-known auger or screw to the return-elevator, which returns them to be again passed through the machine.

The belt L has transverse bars or slats $l'$, and these move with the grain and chaff along over the screen-surfaces J, so that the grain will continually fall through these surfaces and be received and directed into the auger-cases T T', from which the grain is delivered at one side of the machine by the augers, which are revolved in the cases in the usual manner.

U and V are fans or other suitable air-blast apparatus, one of which discharges beneath and through the screen J near its front or receiving end and the other discharges through the screen nearer the rear end, and intermediate between these parts of the screen which receive the blast of these two fans is a close floor J', which is interposed between the screen or sieve portions, at the front and rear thereof.

The operation will then be as follows: The apparatus being in motion, the threshed grain is carried up by the grain-carrier, as previously described, the straw is delivered to the straw-carrier, and the grain falling between the end of the grain-carrier and the commencement of the straw-carrier is received upon the screen J, over which the endless traveling belt L, moving slowly, constantly distributes and moves, with the grain, toward the rear. The blast from the fan U, which is a strong one, lifts and throws the chaff and light material toward the rear, while the grain passing over the screen or riddle will fall through and be received in the auger-case T.

The transverse slats $l'$ form an important feature of this apparatus, since they prevent the grain from being blown along the screen, and thus enable the operator to use an especially strong blast from the fans, thus insuring a more complete separation of the chaff from the grain. As the belt does not move very rapidly, these transverse slats form abutments, against which the grain will be stopped when it reaches them if the blast is sufficiently strong to move the grain along the screens, but it will follow the slow-moving transverse abutments and will during its course constantly fall through the openings in the screen and will be prevented from being blown over the rear end, which is a great source of loss in the ordinary construction of cleaning mechanism.

The interposition of the closed portion J' allows for the placing of the second fan V, the blast from which operates through the rear portion of the screen-floor J to continue and complete the work which is next upon the front end.

By this arrangement I greatly simplify the cleaning mechanism and improve the character and quantity of the work which can be done and prevent the loss of grain at the rear end of the machine.

Having thus described my invention, what I claim as new, and desire to secure by Letters Patent, is—

1. In a grain threshing and cleaning apparatus, the combination with the threshing-cylinder, inclined grain-carrier, and separate straw-carrier approximately in line therewith, of a stationary horizontally-disposed screen located below and receiving grain from the carrier upon its front end, an endless traveling belt having transverse slats moving over the upper surface of the screen and in close contact therewith, and one or more fans located beneath and discharging an air-blast upwardly and rearwardly through the screen.

2. The combination in a grain threshing and cleaning machine, of a threshing-cylinder, inclined grain and straw carrying belts, essentially in line with an interspace for the passage of grain, a stationary horizontally-disposed screen located below and receiving the grain upon its front end, an endless traveling slat belt the upper part of which moves rearwardly over the screen, one or more blast-fans discharging through the screen from below, and receivers and transfer-augers below the screen.

3. The combination in a grain-separator, of a threshing-cylinder, inclined grain and straw carrying belts essentially in line, with an interspace for the passage of grain, a stationary horizontal screen having a close portion intermediate of its length and receiving grain upon its front end, an endless traveling slat belt movable rearwardly in contact with the upper surface of the screen, a plurality of blast-fans, one discharging through the front and the other through the rear of the screen, and independent separated receivers beneath the front and rear parts of the screen with transfer-augers.

4. The combination in a grain-separator, of a threshing-cylinder, inclined grain and straw carriers essentially in line, with an interspace for the passage of grain, and return-boards below both grain and straw carrier, a stationary horizontal two-part screen with an intermediate imperforate section, a plurality of blast-fans with corresponding receivers and transfer-augers located respectively beneath the front and rear screens, the blast from the front fan also passing through the straw-carrier.

5. The combination in a grain-separator, of a threshing-cylinder, inclined grain and straw carriers essentially in line, with an interspace for the passage of grain, a return-board over which the lower part of the straw-carrier is movable, a stationary horizontal two-part screen with an intermediate imperforate section, the front screen receiving the delivery from the grain-carrier, a plurality of blast-fans, and independent receivers and transfer-augers for each section of the screen, an endless traveling belt with transverse slats movable in contact with the upper surface of the screens, guide-rollers by which the rear portion of the belt is inclined upwardly beyond the screen, riddles over which this portion of the belt passes, and a receiver and return screw-auger beneath the riddles.

6. The combination in a grain-separator, of a threshing-cylinder, an upwardly-inclined endless-belt grain-carrier with transverse slats, close bottoms beneath both upper and lower parts of said belt over which it is movable in opposite directions, and a connecting concaved receiver at the lower end, a straw-carrier essentially in line with the grain-carrier, with an interspace and revoluble pickers, a stationary horizontal two-part screen below, with an intermediate imperforate section, a plurality of blast-fans, one discharging through the front and the other through the rear screen, and corresponding receivers and transfer-augers, and an endless traveling slat belt movable from front to rear in contact with the upper surfaces of the screens.

In witness whereof I have hereunto set my hand.

DANIEL BEST.

Witnesses:
S. H. NOURSE,
JESSIE C. BRODIE.